(12) United States Patent
Hösker (10) Patent No.: US 9,487,255 B2
(45) Date of Patent: Nov. 8, 2016

(54) OVERHEAD CONVEYING DEVICE HAVING COLUMN GANTRIES

(71) Applicant: Torsten Hösker, Osterburken (DE)

(72) Inventor: Torsten Hösker, Osterburken (DE)

( * ) Notice: Subject to any disclaimer, the term of this patent is extended or adjusted under 35 U.S.C. 154(b) by 82 days.

(21) Appl. No.: 14/420,063

(22) PCT Filed: Apr. 17, 2013

(86) PCT No.: PCT/DE2013/000199
§ 371 (c)(1),
(2) Date: Feb. 6, 2015

(87) PCT Pub. No.: WO2014/023273
PCT Pub. Date: Feb. 13, 2014

(65) Prior Publication Data
US 2015/0225029 A1    Aug. 13, 2015

(30) Foreign Application Priority Data

Aug. 9, 2012  (DE) .................. 10 2012 214 127

(51) Int. Cl.
*B62D 65/18*        (2006.01)
*B65G 21/20*        (2006.01)
(Continued)

(52) U.S. Cl.
CPC ............. *B62D 65/18* (2013.01); *B65G 21/00* (2013.01); *B65G 21/02* (2013.01); *B65G 21/20* (2013.01); *B65G 41/00* (2013.01); *B65G 41/006* (2013.01)

(58) Field of Classification Search
CPC ...... B62D 65/18; B65G 21/00; B65G 21/02; B65G 21/20
USPC .............................................. 198/346, 860.1
See application file for complete search history.

(56) References Cited

U.S. PATENT DOCUMENTS 4,437,637 A * 3/1984 Buschbom et al. ....... 248/163.2

4,475,648 A * 10/1984 Weeks .......................... 198/830
(Continued)

FOREIGN PATENT DOCUMENTS

CN    1835863 A    9/2006
CN    1847114 A    10/2006
(Continued)

OTHER PUBLICATIONS

U.S. Appl. No. 14/420,103 Office Action Mar. 4, 2016.

*Primary Examiner* — Leslie A Nicholson, III
(74) *Attorney, Agent, or Firm* — King & Schickli, PLLC (57) ABSTRACT

The invention relates to an overhead conveying device (30) for integration into an assembly plant for transporting vehicle components (31) by means of a conveying device (33) arranged on the overhead conveying device (30), said overhead conveying device (30) comprising a supporting framework (38) that has a length of more than 5 m and a width of more than 2 m. The conveying device (33) can be mounted on the supporting framework (38), and the supporting framework (38) and the conveying device (33) form a conveying corridor (32) in which the vehicle components (31) can be transported from an input point to an output point. The supporting framework (38) is mounted on the floor (47) of the assembly plant by bearing means that form, between the underside of the supporting framework (38) and the surface of the floor (47), a free space that is suitable for component assembly and/or for component transport and that is accessible on foot and/or on wheels, at least one bearing means being designed in the manner of a column gantry (39) that comprises at least two support columns (41a,b; 40a,b) whose lower ends are attached to the floor (47) of the assembly plant. At least one transverse bridge (42) is mounted between two support columns (41, 40) in each case, and the supporting framework (38) is arranged on the upper side of the transverse bridge (42).

17 Claims, 9 Drawing Sheets

(51) Int. Cl.
  *B65G 21/02*   (2006.01)
  *B65G 21/00*   (2006.01)
  *B65G 41/00*   (2006.01)

(56) References Cited

U.S. PATENT DOCUMENTS

| | | | |
|---|---|---|---|
| 4,511,024 | A | 4/1985 | Long |
| 5,082,108 | A * | 1/1992 | Douglas ............... 198/836.4 |
| 6,170,732 | B1 | 1/2001 | Vogt et al. |
| 6,372,107 | B1 * | 4/2002 | Besinger et al. ........... 204/479 |
| 7,467,996 | B1 | 12/2008 | Jager |
| 7,498,541 | B2 * | 3/2009 | Inoue et al. ............ 219/86.24 |
| 7,677,428 | B2 | 3/2010 | Kilibarda |
| 7,789,021 | B2 * | 9/2010 | Nishihara et al. ........... 105/153 |
| 8,360,225 | B2 | 1/2013 | Spangler |
| 2004/0251115 | A1 | 12/2004 | Spoeler |
| 2006/0219525 | A1 | 10/2006 | Dohi |
| 2009/0279992 | A1 | 11/2009 | Spangler |
| 2011/0154654 | A1 | 6/2011 | Cardani et al. |
| 2011/0209321 | A1 | 9/2011 | Kilibarda et al. |
| 2011/0314665 | A1 | 12/2011 | Kilibarda |
| 2013/0026002 | A1 | 1/2013 | Spangler |
| 2015/0135636 | A1 | 5/2015 | Ayres |

FOREIGN PATENT DOCUMENTS

| | | |
|---|---|---|
| CN | 2903002 Y | 5/2007 |
| CN | 102114594 A | 7/2011 |
| CN | 202296335 U | 7/2012 |
| DE | 29720801 U1 | 1/1998 |
| DE | 19739148 C1 | 10/1998 |
| DE | 10321736 B3 | 12/2004 |
| DE | 60202985 T2 | 4/2006 |
| DE | 202009006856 U1 | 8/2009 |
| DE | 202011051375 U1 | 10/2011 |
| DE | 102011008623 A1 | 7/2012 |
| EP | 0968073 A1 | 1/2000 |
| EP | 2340982 A1 | 7/2011 |
| JP | 2003341818 A | 12/2003 |
| JP | 2008222137 A | 9/2008 |
| JP | 2009012141 A | 1/2009 |
| WO | 2014023277 A1 | 2/2014 |

* cited by examiner

OVERHEAD CONVEYING DEVICE HAVING COLUMN GANTRIES

FIELD OF THE INVENTION

The invention relates to an overhead conveying device according to the preamble of claim 1 for integration in an assembly plant that is suitable for transporting vehicle components.

BACKGROUND OF THE INVENTION

In assembly plants for manufacturing vehicles, different types of conveying devices and overhead conveying devices are employed. Based on the fact that assembly plants are individually adjusted to each type of vehicle to be manufactured and that the conveying devices are correspondingly configured, the overhead conveying devices under consideration are correspondingly individually designed and manufactured. Here, an overhead conveying device of the type at hand relates to those conveying devices below which at least enough free movement space remains to allow a person to freely walk below them. Usually, free headroom of at least 2.5 m or more is the aim so that forklift trucks or other transport vehicles are also able to cross below the overhead conveying device. Overhead conveying devices of this kind are also employed in order to obtain additional assembly space, wherein, standing on the ground, another conveying device or another kind of assembly module, such as an assembly robot, can be arranged underneath the overhead conveying device. To integrate overhead conveying devices of this kind into a complete assembly plant in a building, it is common in the state of the art to put a supporting framework together from steel girders or the like for erecting the actual conveying device on-site in the building, wherein the struts and pillars are usually welded together on the construction site. This allows for the best possible adaptation to the conditions at hand both with regard to the assembly plants and with regard to the possibilities of the building, and assembly plants or building facilities already present can in particular be taken into account.

SUMMARY OF THE INVENTION

For a start, the generic overhead conveying device is intended for integration in an assembly plant for transporting vehicle components. The type of vehicle components is irrelevant in this case. The substantial feature is that the overhead conveying device is integrated in a complete assembly concept, making it possible here to manufacture a vehicle by transporting the assigned vehicle parts. For this purpose, the overhead conveying device has a supporting framework and at least one conveying device.

In accordance with the generic nature of the invention, the supporting framework has a length of more than 5 m and a width of more than 2 m. The height at which the supporting framework of the overhead conveying device is arranged above the ground of the designated building is irrelevant for the invention at hand, but the free headroom below the supporting frame has to be at least 2 m so as to guarantee a suitable useful height below the supporting framework. The supporting framework itself is realized by longitudinally and/or transversely oriented and/or diagonally interconnected supporting beam elements. Said supporting beam elements are usually designed in the shape of rods and can have tubular profiles, T-girder or other shapes and they can be designed as traction girders, pressure girders or as girders under a bending moment.

The associated conveying device is mounted on the supporting framework and allows transporting corresponding vehicle components, the transport usually taking place along the longitudinal direction of the overhead conveying device.

Furthermore, the supporting framework comprises bearing means on which the overhead conveying device is borne in the assembly plant. It is initially irrelevant whether said bearing means are fixed bearings, mobile bearings or other types of bearings. The supporting framework is at least substantially supported on the bearing means in the direction of gravity and on counter bearings being provided by the assembly plant or by the building.

The commonly found practice of putting together the supporting framework on-site based on the local conditions leads to structural calculations or a previous detailed construction of the supporting framework of the overhead conveying device usually not being carried out. Because of these insufficient calculations, the supporting framework, for safety reasons, is usually designed with a significant oversize, which, however, does not guarantee sufficient safety, either.

However, the design of an overhead conveying device known from the state of the art is particularly disadvantageous in the light of the high amount of time that is required for setting up the corresponding components in the assembly plant. During such setup works, the assembly plant is inevitably unavailable for other purposes in the area of the overhead conveying device to be constructed. In particular when making structural alterations to the assembly plant, switching from one design, for example for manufacturing a particular vehicle model, to a new design of the assembly plant for manufacturing a changed vehicle model, this leads to undesired production downtimes while the overhead conveying device is set up.

Therefore, it is the object of the invention at hand to improve the process of setting up an overhead conveying device in an assembly plant so as to avoid the described disadvantages.

Said object is attained by an overhead conveying device according to the teaching of claim 1.

Advantageous embodiments of the invention are the subject-matter of the dependent claims.

The basic idea of the overhead conveying device according to the invention is that the bearing means for supporting the supporting framework at the desired height are designed in the manner of column gantries. Said column gantries are characterized in that there are at least two support columns whose lower ends are attached to the floor of the assembly plant. Further, the column gantry comprises a transverse bridge that is arranged between the two support columns. The supporting framework can be placed on said transverse bridge from the top. The use of column gantries according to the invention for supporting the supporting framework allows erecting the overhead conveying device step by step from prefabricated components. When assembling the overhead conveying device, the column gantries can first be positioned one by one and be fixed to the floor of the building. Subsequently, the supporting framework in its prefabricated form can be placed on the transverse bridges of the column gantries, for which purpose a suitable lifting vehicle may be employed, such as a sufficiently large fork lift, for example. As a result, the assembly time for erecting the overhead conveying device can be significantly shortened. Also, the column gantries can be calculated very well in terms of their mechanical stability so that the usual excessive size is unnecessary. Moreover, the supporting framework placed on the transverse bridges can be optimally aligned and adjusted before the supporting framework is fixed to the transverse bridges.

According to a preferred embodiment, it is provided that a separating plane extends between the column gantries and the supporting framework, fixing means, by means of which the supporting framework can be fixed on the column gantry, crossing the separating plane. For example, fastening screws, fastening bolts or welding seams can be considered as fixing means within the meaning of this claim. The continuous separating plane between the column gantries on the one hand and the supporting framework on the other hand allows optimally adjusting the position of the supporting framework once it has been placed on the transverse bridges of the column gantries.

To ensure the highest possible stability of the overhead conveying device, it is particularly advantageous if the support columns and/or the transverse bridges of the column gantry are produced from a tubular material having a closed tubular cross-section. In particular tubes having a rectangular or square cross-section are eminently suitable for producing the column gantry.

The manner in which the transverse bridge is connected to the support columns to form the column gantry of the overhead conveying device according to the invention is generally optional. In view of the highest possible stability, it is particularly advantageous if the upper ends of the support columns and/or the lateral ends of the transverse bridges are miter-cut and the surfaces of the end cross-sections of the two support columns come into flush contact with the surfaces of the end cross-sections of the transverse bridge.

Any types of fixing means are conceivable for fixing the end cross-sections of the transverse bridge on the one hand and of the support columns on the other hand. Particularly high stability is achieved if the end cross-sections are welded together.

The column gantry required for forming the overhead conveying device according to the invention has an especially large cross-section because of its gantry-shaped structure so that a correspondingly large transport space is necessary when transporting the column gantry. To reduce the transport space necessary for transporting the column gantry, it is particularly advantageous if the support columns are designed in two parts, wherein the two parts of the support columns can be connected to each other in a connecting point. The separating point of the support columns should ideally be located in proximity to the adjoining point with the transverse bridge of the column gantry. As a result, the column gantry can thus be disassembled into three pieces, each of which has a substantially axial longitudinal extension and can be correspondingly transported within very little transport space. At the actual usage site, the column gantry can be put together by mounting the lower parts of the support columns to the upper parts of the support columns, which are connected to the transverse bridge. To fasten the supporting framework to the transverse bridge after erection of the column gantries, it is particularly advantageous if fastening straps are provided on the transverse bridge. The manner of arrangement of the fastening straps can additionally predefine a specific orientation of the supporting framework relative to the column gantries.

In accordance with the invention, the integration of the overhead conveying device in an assembly plant is achieved with little idle times as a result of erecting the overhead conveying device by a self-supporting design of the supporting framework and by preassembly of the supporting framework. The supporting framework can be transported in preassembled form from the place of manufacture to the place of use.

However, it is particularly advantageous if both the supporting framework and the conveying device are preassembled on the supporting framework before being erected at the place of use. The supporting framework, along with the conveying device that is arranged thereon, can be transported in preassembled form from the place of manufacture to the place of use.

It is obvious that, for integrating the conveying device in the assembly plant, it is necessary to connect several interface connections, whether they are power connections, data connections or process lines, such as pressurized air or hydraulic oil, between the preassembled overhead conveying device and the rest of the assembly plant.

It is at least required in accordance with the invention that the actual supporting framework is already preassembled and, furthermore, that the conveying device is advantageously mounted on the supporting framework prior to erection at the place of use. Thus, all that is needed for realizing the overhead conveying device in the assembly plant is clearing corresponding space and creating corresponding counter bearings for receiving the bearing means, wherein the preassembled overhead conveying device then has to be erected only by means of a crane. Hereby, the assembly time for erecting the overhead conveying device is drastically reduced in comparison to all known devices. Even though this is associated with a slight disadvantage with regard to flexible adaptation to the local realities, the advantages with regard to little idling of the assembly plant prevail.

It is particularly advantageous if the supporting framework is designed in the manner of a spatial truss. This means that the self-supporting supporting framework is formed by longitudinally oriented, transversely oriented, diagonal and upright interconnected supporting beam elements. This truss structure can ensure high stiffness of the supporting framework while weight is low, which in particular facilitates the transport of the preassembled overhead conveying device.

Furthermore, it is particularly advantageous if the supporting framework is formed by a welded structure. This means that the self-supporting supporting framework is substantially formed by steel struts and, if need be, by other steel elements, such as gusset plates, which are welded together. If the conveying device is light or if saving weight is generally very important, it is also conceivable to manufacture the supporting framework from aluminum, for example, and to similarly weld together the individual elements, such as struts and gusset plates.

As compared to a screwed design, a welded structure has, among other things, the advantage that there is no risk that an inadmissible change to the supporting framework can later be made by the plant operator. In designs from the state of the art, this might not be critical because of the oversize that is usually present. In a specific configuration of the supporting framework to fit the conveying device to be supported, a manipulation of the supporting framework can cause extensive damage, which is counteracted by a welded structure.

Furthermore, it is particularly advantageous if a maintenance walkway is present along at least one longitudinal side of the conveying device. Said maintenance walkway is to be designed in such a manner that it is accessible on foot without any risk. To this end, the maintenance walkway is arranged at a longitudinal side of the supporting framework and is connected thereto. The maintenance walkway and the supporting framework can be connected during preassembly of the overhead conveying device, while it is also conceivable to fix the maintenance walkway to the supporting framework on site as a per se preassembled attachment part.

It is particularly advantageous if maintenance walkways are present on both sides of the conveying device. To increase the stiffness of the entire arrangement and in particular the stability of the maintenance walkways, the maintenance walkways present on both sides along the conveying device are connected to each other via connecting girders.

In case maintenance walkways are present on both sides and the conveying device is disposed in-between, the maintenance walkways being connected at their ends via connecting girders, it is furthermore particularly advantageous if at least one vertical transport opening is provided. The latter is to be arranged between the supporting framework, the maintenance walkways and the connecting girders. The vehicle components can then be transported from the conveying device, which is located above the supporting framework, in a largely vertical direction from above the supporting framework to a location below the supporting framework through said vertical transport opening. Thus, vehicle components transported above the supporting framework can be transferred to another conveying device or to an assembly device below the overhead conveying device.

In this context, it is correspondingly particularly advantageous if corresponding vertical transport openings are provided at both ends of the conveying device so that vehicle components can be transferred from below the overhead conveying device at one end of the overhead conveying device. Then, the vehicle component can be transported along the overhead conveying device by the conveying device located thereon and can subsequently be transferred again from above the supporting framework down to below the supporting framework through the other vertical transport opening at the other end of the overhead conveying device.

If maintenance walkways are present at both sides having the vertical transport opening disposed between them at the end of the supporting framework, it is furthermore particularly advantageous if a closing means is present that can be adjusted between an open position and a closed position. The closing means is to be designed such that it is accessible on foot and that in the open position it releases the required vertical transport opening for use of the overhead conveying device and that in a closed position it allows passage, advantageously without steps, between the two maintenance walkways. Thus, in case of maintenance being carried out usually at a standstill of the conveying device, the latter can be accessed substantially circumferentially on foot by way of the maintenance walkways and of the connecting closing means.

Since the overhead conveying device is preassembled and the stiffness of the supporting framework is suitably configured to fit the weight of the overhead conveying device and its weight distribution, it is possible in a particularly advantageous fashion to allow a variable changeable erection of the supporting framework in the assembly plant. In this way, in particular the disadvantage is compensated that, unlike in the state of the art, an adaptation to the realities encountered on site is impossible, but that instead there has to be a suitable possibility of erecting the overhead conveying device in the assembly plant in its completely preassembled state with defined positions of the bearing means.

Here, it is particularly advantageous if the number $N_L$ of bearing means is higher than the number $N_E$ being required for bearing. This means that a number $N_L$ of bearing means on each of which erection in the assembly plant can take place is present on the supporting framework, while it is actually unnecessary for erection of the overhead conveying device in the assembly plant that each of these present bearing means is used. Instead, it is sufficient if only the required number $N_E$ of counter-bearings is present. In this context, it is further provided that those bearing means to be used among the available bearing means when erecting the overhead conveying device in the assembly plant can be selected arbitrarily in the required number $N_E$. This obviously means that the overhead conveying device can still be borne at all available bearing means in the assembly plant on counter-bearings.

A design that has at least six bearing means is particularly advantageous, the required number $N_E$ being smaller than/equal to the number $N_L$ of present bearing means multiplied by 0.72 and rounded up. This means that in case of six available bearing means, erection is to take place on at least five counter-bearings. In case of seven or eight available bearing means, erection is to take place by means of at least six of the available bearing means. In case of nine available bearing means, seven bearing means are accordingly to be used, and so on. It is particularly advantageous if the stiffness of the supporting framework is selected such that in particular the number $N_L$ of the available bearing means multiplied by 0.6 and rounded up is necessary as the required number $N_E$.

Furthermore, it is advantageous if the overhead conveying device has support elements on each of which a bearing means is arranged. In this regard, an advantageous design requires a number of support elements that corresponds to the required number $N_E$ of bearing means, while in an advantageous design a support element is still associated with each bearing means. The support elements can be free-standing support columns and/or wall brackets and/or freely suspended traction elements. It is at least provided that the overhead conveying device rests with the supporting framework at the bearing means on counter bearings of the support elements, which in turn are connected within the assembly plant or the building.

Here, it is particularly advantageous if the number of support elements is higher than the number $N_E$ being required for bearing, wherein any one of the present support elements can be removed and/or replaced at the place of use without limiting the usability of the overhead conveying device. Thus, a support column can be removed in particular in case of damage if a transport vehicle collides with a support column, for example, without limiting the functionality of the overhead conveying device either with respect to the transport of vehicle components by way of the conveying device or with respect to ensured sufficient statics. In case of damage, an uncomplicated replacement can thus take place without assembly having to stand still.

In the following figures, two overhead conveying devices having a supporting framework mounted on column gantries are outlined as examples.

DETAILED DESCRIPTION OF THE INVENTION

Figure 1:
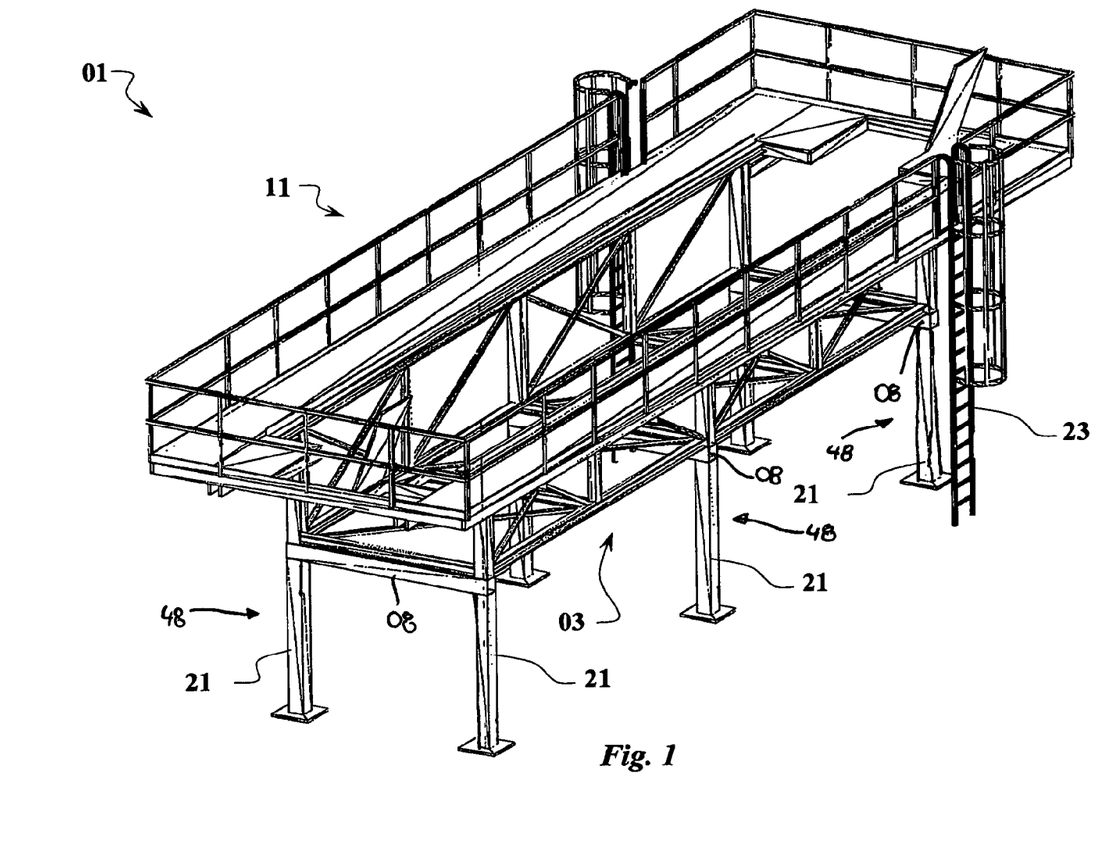
FIG. 1 shows a first exemplary overhead conveying device in a perspective view leaving out the conveying device.
Figure 2:
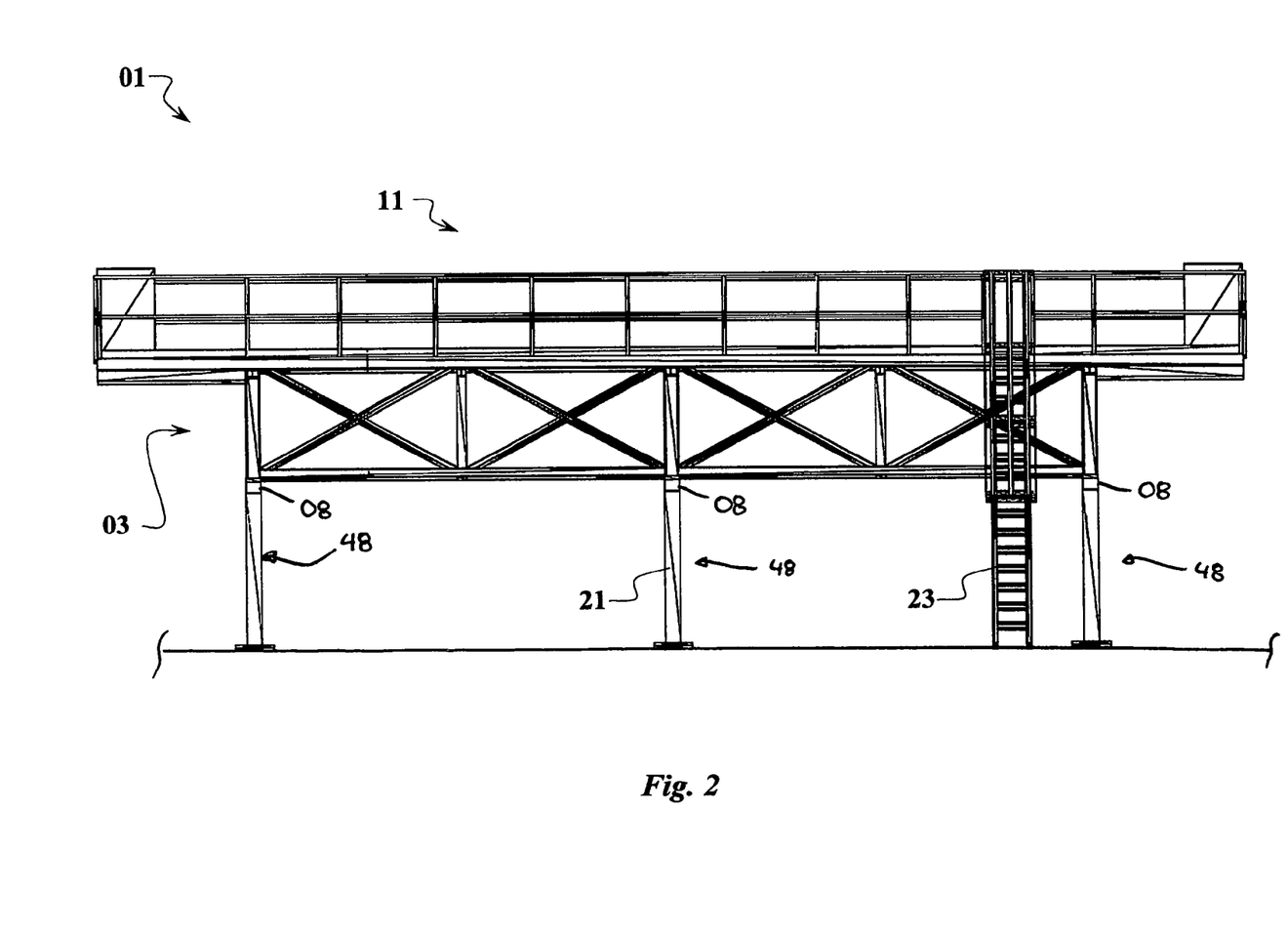
FIG. 2 shows a lateral view of FIG. 1.
Figure 3:
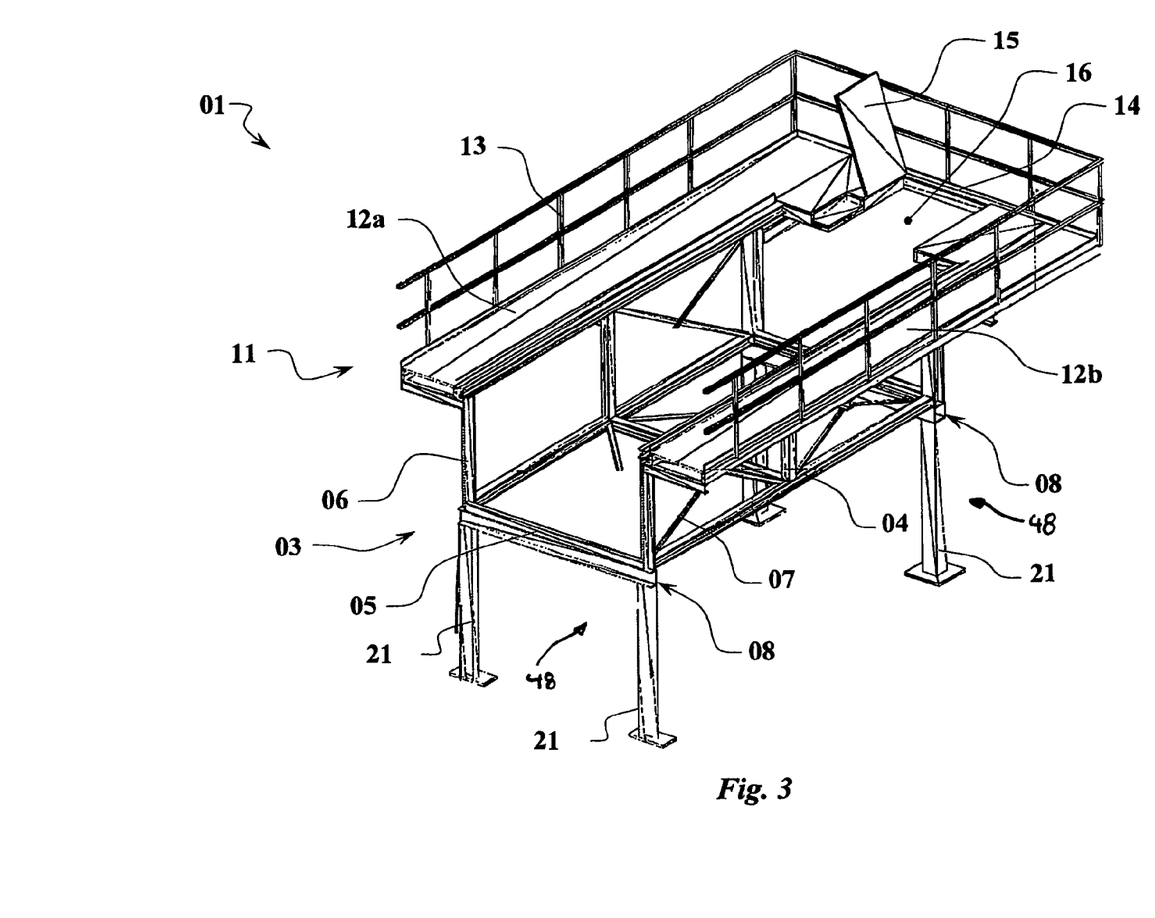
FIG. 3 shows a half-section of the view of FIG. 1.
Figure 4:
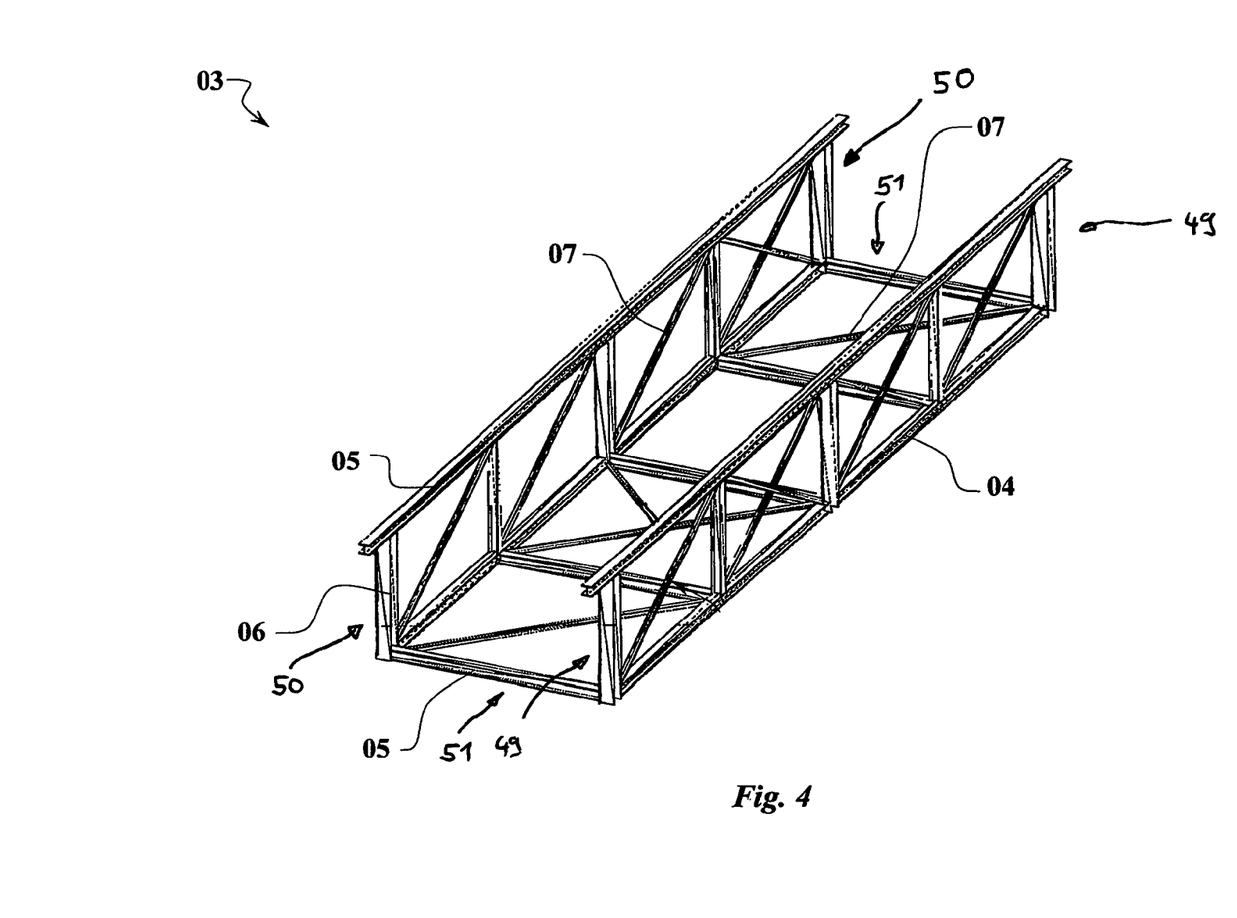
FIG. 4 shows the supporting framework of FIG. 1.

In FIG. 1, a perspective illustration of an overhead conveying device 01 is outlined in an exemplary embodiment. However, illustration of the conveying device belonging to the overhead conveying device 01 has been omitted. As the person skilled in the art can easily appreciate, the conveying device is located centrally in the supporting framework 03 and depending on the embodiment it projects beyond the supporting framework 03. Herein, the supporting framework 03 is designed in the manner of a truss and comprises a plurality of supporting beam elements 04-07 that are welded together. As can be taken from FIG. 4 in this regard, the supporting framework 03 is formed by longitudinally oriented supporting beam elements 04, transversely oriented supporting beam elements 05, upright supporting beam elements 06 and diagonal supporting beam elements 07. The supporting framework 03 with its supporting beam elements 04, 05, 06 and 07 is designed such that there is a sufficient self-supporting inherent stiffness when the conveying device is mounted thereon so that a transport of the entire overhead conveying device 01 or at least of the supporting framework 03 having the conveying device mounted thereon in its entirety is possible. For this purpose, the supporting framework 03 is composed of two lateral parts 49 and 50 and a bottom part 51. The lateral parts 49 and 50 and the bottom part 51 each have an even component structure of high stiffness in the component plane. The lateral parts 49 and 50 and the bottom part 51 are composed of the supporting beam elements 04, 05, 06 and 07. In view of stiffness, in particular bending stiffness, the supporting framework 03 is to be configured to the effect that bearing on the associated column gantries 48 is possible in a substantially deformation-free manner both in case of transport and for later erection.

In correspondence to the static configuration of the overhead conveying device 01, which has to be ascertained in each case, the supporting framework 03 has a plurality of column gantries 48. Each column gantry 48 consists of two support columns 21 and a transverse bridge 08 arranged in-between. Furthermore, in this embodiment example, the statics of the supporting framework 03 are configured and the stiffness is selected in such a manner that the stability of the entire arrangement is ensured even if individual support columns are omitted. Thus, it is conceivable on the one hand to use only five of the illustrated six support columns 21 in case of erection in the assembly plant, and on the other hand it is also possible to use six support columns, in which case a support column can be replaced in case of damage resulting from a collision with a vehicle, for example, without limiting the functionality of the overhead conveying device.

Figure 5:
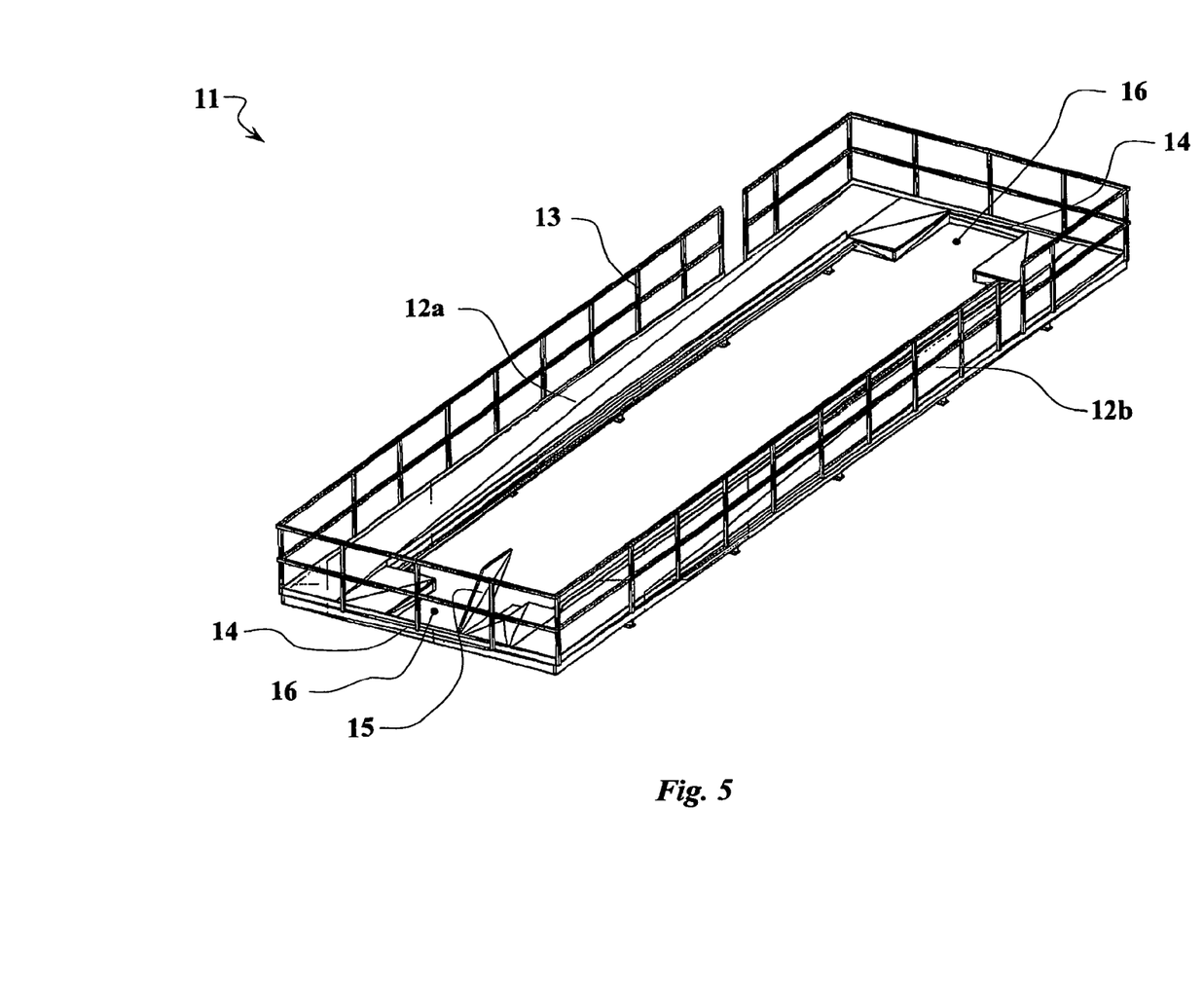
FIG. 5 shows the maintenance walkway of FIG. 1.

Furthermore, in FIG. 5, the maintenance scaffold 11 belonging to the overhead conveying device 01 is visible, having maintenance walkways 12 *a* and 12*b*, see also FIG. 5, which extend at both sides of the overhead conveying device. At their ends, said maintenance walkways 12 are connected to connecting girders 14, providing increased stability of the entire arrangement together with the maintenance scaffold 11 and of the maintenance walkways 12*a*, 12*b*. A surrounding safety railing 13 ensures the safety of maintenance personnel when accessing the maintenance walkway 12. Access to the maintenance walkway 12 is provided by ladders 23 arranged on the maintenance scaffold 11.

Furthermore, the two vertical transport openings 16 present at the end sides are visible, through which the vehicle component to be transported can be passed. To permit risk-free passage from one maintenance walkway 12*a* to the other maintenance walkway 12*b*, closing means 15 are further present at the vertical transport openings 16. Said closing means 15 can be brought from an outlined open position into a closed position, thus providing a level passage from one side to the other side.

Figure 6:
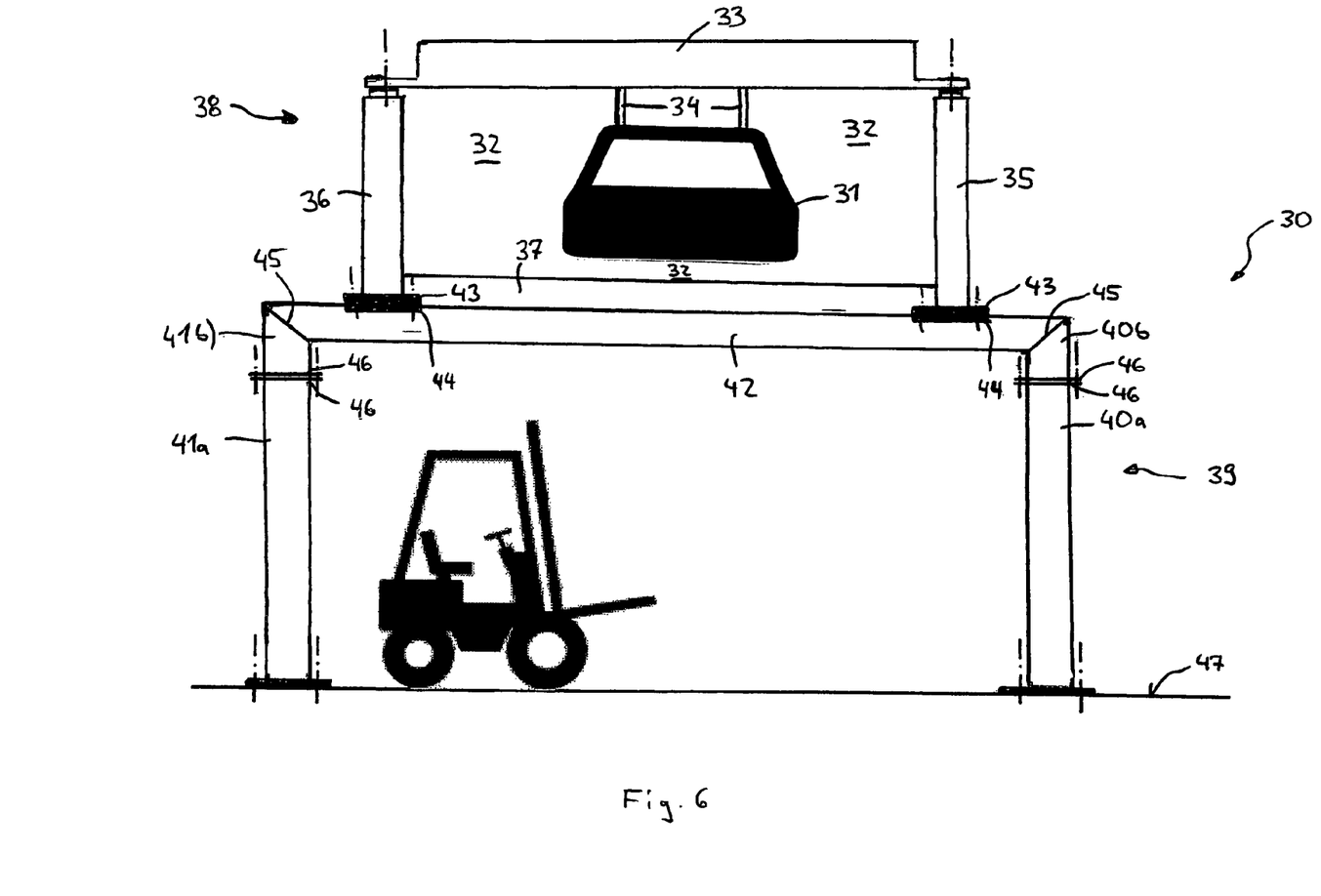
FIG. 6 shows a second overhead conveying device in a schematic front view.

FIG. 6 shows a second overhead conveying device 30 in a front view. The overhead conveying device 30 is provided for transporting vehicle components 31 along a conveying corridor 32. The actual conveying motion for transporting the vehicle components 31 is performed by a conveying device 33, such as a pushing conveyor. The conveying device 33 is fixed to the vehicle components 31 by coupling members 34. At the sides, the conveying device 33 itself is placed on two lateral parts 35 and 36 and is fixed there. The lateral parts 35 and 36 are connected to each other by a bottom part 37 below the conveying corridor 32. Together, the two lateral parts 35 and 36 and the bottom part 37 form a supporting framework 38 that has a U-shaped trough shape and limits the conveying corridor 32 to the sides and from below, respectively. The supporting framework 38 is designed to be self-supporting and can be transported from a production site to the usage site in preassembled form. To produce the overhead conveying device 30, the self-supporting supporting framework 38 is placed from above on top of several column gantries 39 that are arranged one behind the other and is fixed there. Each column gantry consists of two support columns 40 and 31 and a transverse bridge 42 arranged between the two support columns 40 and 41. Fastening straps 43 and 44 are provided at the lower ends of the lateral parts 35 and 36 and at the top side of the transverse bridge 42, respectively, said fastening straps 43 and 44 allowing the supporting framework 38 to be aligned on the column gantries 39 and to be subsequently fixed. The support columns 40 and 41 and the transverse bridge 42 are produced from rectangular tubes and have a miter cut on each of their touching ends so that the surfaces of the end cross-sections of the two support columns come into flush contact with the surfaces of the end cross-sections of the transverse bridge. To connect the support columns 40 and 41 and the transverse bridge 42, the miter-cut end cross-sections are welded together in welded seams 45.

To be able to transport the column gantries within little transport space, the two support columns can be disassembled into two parts. For this purpose, connecting points 46 are provided on the support columns 40 and 41 in which the support columns 40 and 41 can be disassembled into two parts 40*a* and 40*b* and 41*a* and 41*b*, respectively.

Figure 7:
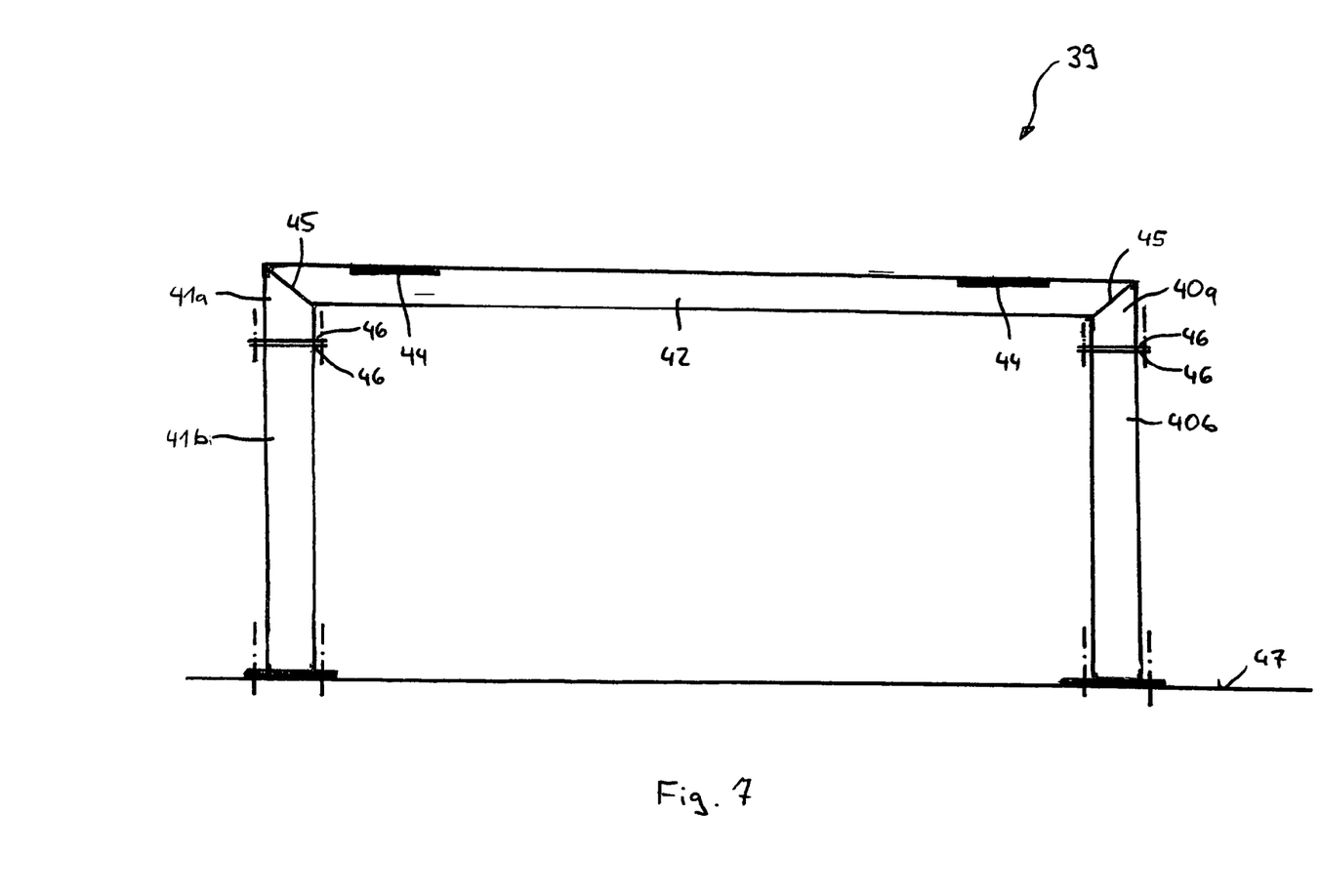
FIG. 7 shows the column gantry of the overhead conveying device according to FIG. 6 in a front view.
Figure 8:
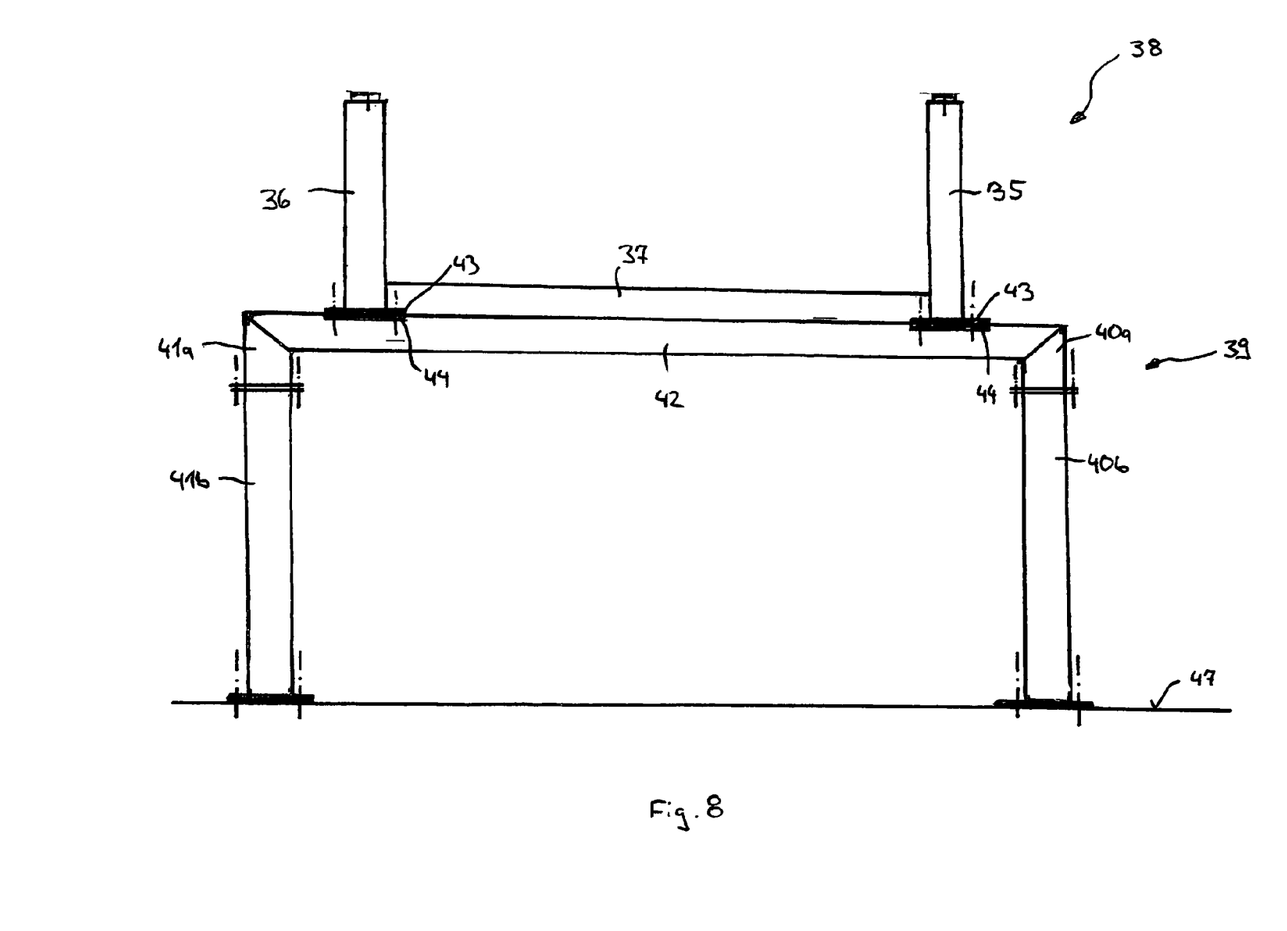
FIG. 8 shows the column gantry according to FIG. 7 after mounting of the supporting framework.
Figure 9:
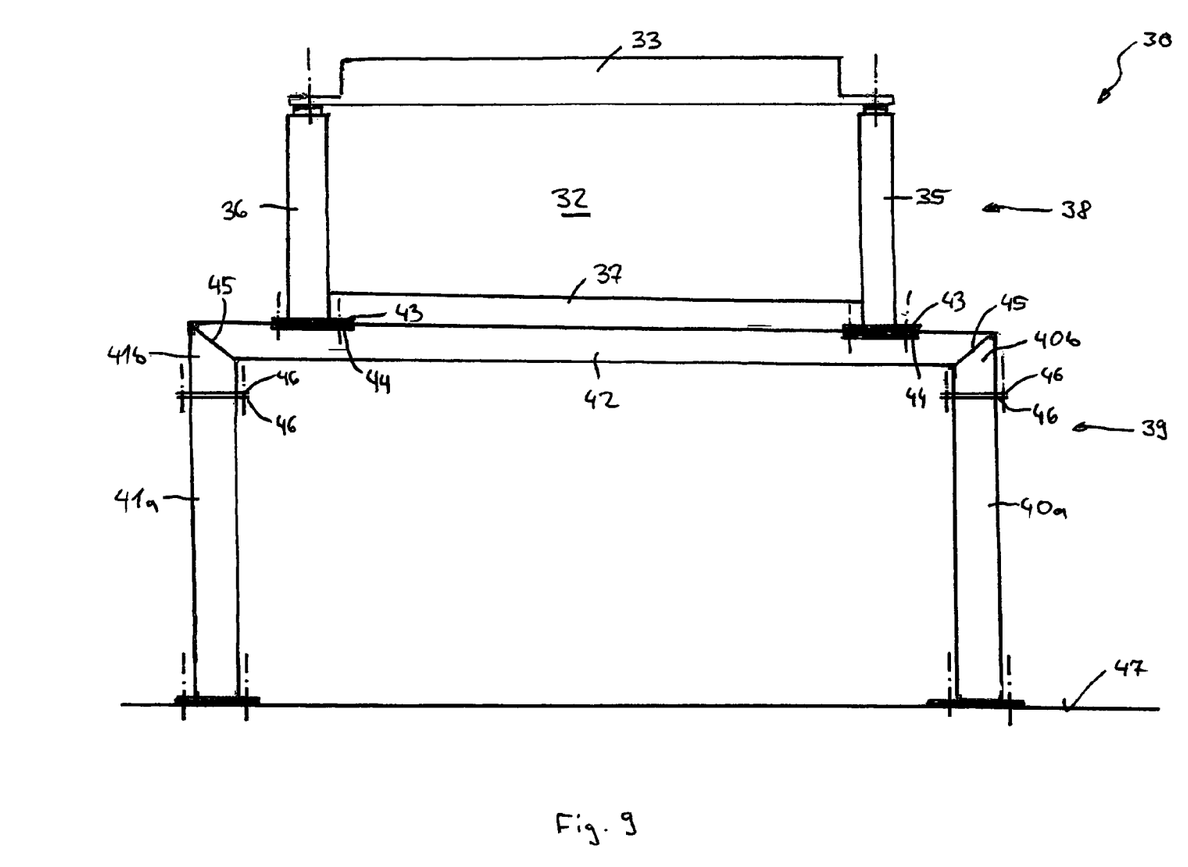
FIG. 9 shows the column gantry including the supporting framework according to FIG. 8 after mounting of the conveying device, such as a pushing conveyor.

With the aid of the illustrations in FIGS. 7 to 9, the assembly process for erecting the overhead conveying device 30 is to be schematically depicted. First, as illustrated in FIG. 7, all column gantries of the overhead conveying device 30 are positioned in the assembly hall and are fixed. Subsequently, the prefabricated and self-supporting framework 38 is placed on top of the at least two transverse bridges 42 of two column gantries, which are arranged one behind the other. Of course, there may also be more than two column gantries for supporting the supporting framework from below. Finally, as illustrated in FIG. 9, the conveying device 33 is placed on the supporting framework 38 from above and is fixed. Transport vehicles and assembly devices can be arranged in the space between the transverse bridges 42 and the hall floor 47.

The invention claimed is:

1. An overhead conveying device (01, 30) for integration into an assembly plant for transporting vehicle components (31) by means of a conveying device (33) that is arranged on the overhead conveying device (01, 30), comprising:
a supporting framework (03, 38), said supporting framework (03, 38) having a length of more than 5 m and a width of more than 2 m, and
the conveying device (33) being mountable on the supporting framework (03, 38), and
the supporting framework (03, 38) and the conveying device (33) forming a conveying corridor (32) in which the vehicle components (31) can be transported from an input point to an output point, and
the supporting framework (03, 38) being mounted on the floor (47) of the assembly plant by bearing means, and
the bearing means forming, between the underside of the supporting framework (03, 38) and the surface of the floor (47), a free space that is suitable for component assembly and/or for component transport and that is accessible on foot and/or on wheels,
characterized in that at least one bearing means is designed in the manner of a column gantry (39, 48), said column gantry (39, 48) comprising
at least two support columns (21, 40, 41) whose lower ends are attached to the floor (47) of the assembly plant, and
at least one transverse bridge (08, 42) being mounted between two support columns (21, 40, 41) in each case, and the supporting framework (03, 38) being arranged on the upper side of the transverse bridge (08, 42).

2. The overhead conveying device according to claim 1, characterized in that a separating plane extends between the column gantries (39, 48) and the supporting framework (03, 38), fixing means, by means of which the supporting framework (03, 38) can be fixed to the column gantries (39, 48), crossing the separating plane.

3. The overhead conveying device according to claim 2, characterized in that at least one transverse bridge (42) of the column gantries is wider than the supporting framework (38), the supporting framework (38) being positionable relative to the transverse bridge (42) by displacement in the separating plane.

4. The overhead conveying device according to claim 1, characterized in that the support columns (21, 40, 41) and/or the transverse bridge (08, 42) of the column gantry (39, 48) are produced from tubular material having a closed tubular cross-section.

5. The overhead conveying device according to claim 4, characterized in that the upper ends of the support columns (40, 41) and/or the lateral ends of the transverse bridge (42) are miter-cut, the surfaces of the end cross-sections of the support columns (40, 41) coming into flush contact with the surfaces of the end cross-sections of the transverse bridge (42).

6. The overhead conveying device according to claim 4, characterized in that the upper ends of the support columns (40, 41) and the lateral ends of the transverse bridge (42) are welded to each other in a welded seam (45).

7. The overhead conveying device according to claim 1, characterized in that the support columns (40, 41) are designed in two parts, said two parts (40a, 40b, 41a, 41b) of the support column (40, 41) being connectable to each other in a connecting point (46).

8. The overhead conveying device according to claim 1, characterized in that fastening straps (44) are provided on the upper side of the transverse bridge (42), the supporting framework (38) being connectable to the transverse bridge (42) at the fastening straps (44).

9. The overhead conveying device according to claim 1, characterized in that the supporting framework (03, 38) is designed to be self-supporting and can be transported in preassembled form.

10. The overhead conveying device according to claim 1, characterized in that the supporting framework (38) comprises at least two lateral parts (35, 36, 49, 50) that extend parallel to the longitudinal axis of the supporting framework and limit the cross-section of a conveying corridor (32) to the right and to the left.

11. The overhead conveying device according to claim 10, characterized in that the conveying device (33) is mountable between the two lateral parts (35, 36, 49, 50) of the supporting framework (03, 38) and limits the cross-section of the conveying corridor (32) from the top.

12. The overhead conveying device according to claim 10, characterized in that a maintenance walkway (12) is arranged on at least one lateral part (49, 50) along the longitudinal side of the conveying device (33).

13. The overhead conveying device according to claim 10, characterized in that the supporting framework (03, 38) comprises at least one floor part (37, 51) that limits the cross-section of the conveying corridor (32) from below.

14. The overhead conveying device according to claim 1, characterized in that the supporting framework (03, 38) is designed in the manner of a spatial truss that comprises longitudinally and transversely oriented and diagonal and upright interconnected supporting beam elements (04, 05, 06, 07).

15. The overhead conveying device according to claim 14, characterized in that the supporting beam elements (04, 05, 06, 07) have a closed tubular cross-section.

16. The overhead conveying device according to claim 1, characterized in that the supporting framework (03, 38) is formed by a welded structure.

17. An overhead conveying device (01, 30) for integration into an assembly plant for transporting vehicle components (31) by means of a conveying device (33) that is arranged on the overhead conveying device (01, 30), comprising:
a supporting framework (03, 38), said supporting framework (03, 38) having a length of more than 5 m and a width of more than 2 m, and the conveying device (33) being mountable on the supporting framework (03, 38), and the supporting framework (03, 38) and
the conveying device (33) forming a conveying corridor (32) in which the vehicle components (31) can be transported from an input point to an output point, and
the supporting framework (03, 38) being mounted on the floor (47) of the assembly plant by a bearing, and
the bearing forming, between the underside of the supporting framework (03, 38) and the surface of the floor (47), a free space that is suitable for component assembly and/or for component transport and that is accessible on foot and/or on wheels,
characterized in that at least one bearing is designed in the manner of a column gantry (39, 48), said column gantry (39, 48) comprising at least two support columns (21, 40, 41) whose lower ends are attached to the floor (47) of the assembly plant, and at least one transverse bridge (08, 42) being mounted between two support columns (21, 40, 41) in each case, and the supporting framework (03, 38) being arranged on the upper side of the transverse bridge (08, 42).

\* \* \* \* \*